United States Patent
Cha et al.

(10) Patent No.: US 9,873,384 B2
(45) Date of Patent: Jan. 23, 2018

(54) BICYCLE CARRIER APPARATUS FOR VEHICLE

(71) Applicant: Hyundai Motor Company, Seoul (KR)

(72) Inventors: Dong Eun Cha, Suwon-si (KR); Jin Young Yoon, Gimpo-si (KR); Hyun Gyung Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 122 days.

(21) Appl. No.: 14/948,279

(22) Filed: Nov. 21, 2015

(65) Prior Publication Data

US 2017/0072867 A1 Mar. 16, 2017

(30) Foreign Application Priority Data

Sep. 11, 2015 (KR) .................. 10-2015-0129044

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC ............. Y10T 403/315; Y10T 403/581; Y10T 403/59; B60R 9/045; B60R 2011/0082; E05D 11/105
USPC ....... 224/507, 489, 491, 924, 432, 484–486, 224/497–498, 500, 501, 314, 42.34, 282, 224/502, 553, 444, 549; 220/666; 403/315, 316, 321, 322.4; 292/194, 195, 292/197, 200, 153; 211/17–22
See application file for complete search history.

(56) References Cited

U.S. PATENT DOCUMENTS

| | | | | |
|---|---|---|---|---|
| 5,622,299 A | * | 4/1997 | Berard | B60P 3/062 224/281 |
| 7,909,213 B2 | * | 3/2011 | Bergerhoff | B60R 9/10 224/197 |
| 8,317,068 B2 | * | 11/2012 | Huang | B60R 9/10 224/497 |
| 9,174,584 B1 | * | 11/2015 | Cha | B60R 9/10 |
| 2008/0142559 A1 | | 6/2008 | Lim et al. | |
| 2014/0263503 A1 | * | 9/2014 | Laverack | B60R 9/045 224/315 |

FOREIGN PATENT DOCUMENTS

| KR | 10-1998-0074761 A | 11/1998 |
|---|---|---|
| KR | 10-2011-0035378 A | 4/2011 |
| KR | 10-1154526 B1 | 6/2012 |
| KR | 10-1186959 B1 | 9/2012 |

* cited by examiner

*Primary Examiner* — Adam Waggenspack
(74) *Attorney, Agent, or Firm* — Morgan, Lewis & Bockius LLP

(57) ABSTRACT

A bicycle carrier apparatus for a vehicle may include a slide carrier configured to slide in a front-rear direction of a rear bumper beam to be drawn in and out of the rear bumper beam, extension supports laterally extended on the slide carrier to load a bicycle, a retainer rotatably provided on the slide carrier, with a stop block having a plurality of angled surfaces and provided on an end of the retainer, and a locking device fixed to the slide carrier and to which the end of the retainer is rotatably coupled, the locking device configured to be selectively stopped by the stop block so that the locking device restricts a rotation of the retainer.

8 Claims, 7 Drawing Sheets

BICYCLE CARRIER APPARATUS FOR VEHICLE

CROSS REFERENCE TO RELATED APPLICATION

The present application claims priority to Korean Patent Application No. 10-2015-0129044, filed Sep. 11, 2015, the entire contents of which is incorporated herein for all purposes by this reference.

BACKGROUND OF THE INVENTION

Field of the Invention

The present invention relates to a bicycle carrier apparatus for a vehicle that is mounted on the rear bumper of a vehicle to load a bicycle.

Description of Related Art

Recently, as people use bicycles for leisure activities, they load bicycles on vehicles to carry them around bicycle-only roads or mountains.

However, bicycles are generally large in volume, so they are difficult to load even using the trunk or the backseat space of vehicles.

Although various methods of loading a bicycle on the outer surfaces of vehicles have been proposed to solve the problem, the manner of loading and fixing a bicycle on the roof panel of a vehicle not only makes loading itself very inconvenient, but increases the height of the vehicle, such that it may cause a safety accident due to the bicycle caught to a tunnel or a building, when the vehicle enters the structures.

In the case of a bicycle mounted on the tailgate of a vehicle, complex installation is required for a specific carrier device; and the carrier device remains visible even when there is no bicycle mounted thereon, thereby detracting from the external appearance of a vehicle.

Further, it is troublesome to install the carrier device in order to load a bicycle and to remove the carrier device, when there is no need for usage, thus decreasing convenience.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a carrier apparatus for a vehicle which is disposed inside a rear bumper beam of a vehicle, is not exposed to the outside when not in use, and can keep the external appearance of the vehicle and improve convenience by automatically drawing out of a rear bumper beam so that a bicycle can be loaded, when the bicycle loading is desired.

According to various aspects of the present invention, a bicycle carrier apparatus for a vehicle may include a slide carrier configured to slide in a front-rear direction of a rear bumper beam to be drawn in and out of the rear bumper beam, extension supports laterally extended on the slide carrier to load a bicycle, a retainer rotatably provided on the slide carrier, with a stop block having a plurality of angled surfaces and provided on an end of the retainer, and a locking device fixed to the slide carrier and to which the end of the retainer is rotatably coupled, the locking device configured to be selectively stopped by the stop block so that the locking device restricts a rotation of the retainer.

Guide rails extending frontward and rearward may be disposed on the rear bumper beam, and the slide carrier may have side rails configured to slide on the guide rails, so the slide carrier is drawn in and out along the guide rails.

Extension rails may be provided on the slide carrier between the side rails, and the extension supports may be slidably disposed on the extension rails to slide laterally along the extension rails.

The stop block of the retainer may be a polygonal block provided with a plurality of flat surfaces relative to a frontward and rearward rotating direction of the retainer.

The stop block of the retainer may be a rectangular cross-sectional block having four flat surfaces.

The locking device may include a housing mounted to the slide carrier, with the end of the retainer laterally passing through the housing, an operation lever externally provided on the housing such that the operation lever is horizontally rotated frontward and rearward, and a locking rod internally provided inside the housing at a location adjacent to the end of the retainer and rotated in conjunction with the rotation of the operation lever so as to be caught by the stop block of the retainer.

The operation lever may be externally provided on a top wall of the housing and the locking rod is internally provided inside the top wall of the housing, and the operation lever and the locking rod may be coupled to each other by a hinge pin that passes vertically through the operation lever, the top wall of the housing, and the locking rod.

A first end of the operation lever may be rotatably mounted to the top wall of the housing such that the operation lever is rotated frontward and rearward, with a stop protrusion protruding from the first end of the operation lever, and a second end of the operation lever may extend from the first end for a user to rotate the operation lever while holding the second end of the operation lever, and a locking protrusion may protrude from the top wall of the housing such that during a rotation of the operation lever, the stop protrusion of the operation lever is configured to be caught by the locking protrusion, thereby stopping the rotation of the operation lever.

An eccentric protrusion may protrude from an eccentric position of the locking rod such that in an initial position, the eccentric protrusion does not interfere with the stop block of the retainer, but when the eccentric protrusion is rotated in conjunction with a rotation of the operation lever, the eccentric protrusion is configured to come into contact with the stop block, thereby stopping the rotation of the retainer.

According to the bicycle carrier apparatus for a vehicle that has the structure described above, the bicycle carrier is disposed inside the bumper back beam at the rear of a vehicle, so it is not exposed to the outside in normal times, but automatically slides out from the bumper back beam to load a bicycle, and therefore, the external appearance of a vehicle is maintained and convenience is also improved.

Further, it is more convenient to use the retainer for retaining a loaded bicycle with a clamping device, so the commercial value is improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
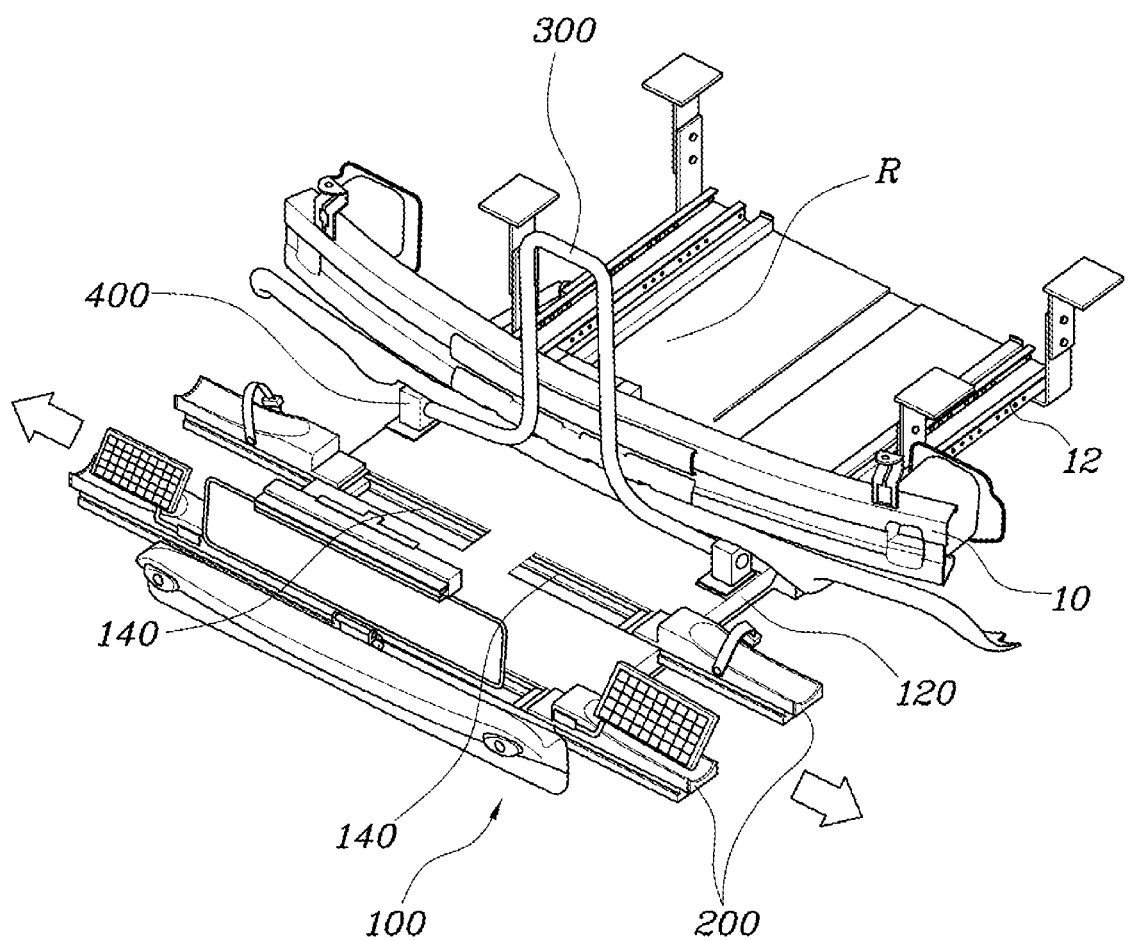
FIG. 1 is a view showing an exemplary bicycle carrier apparatus for a vehicle according to the present invention.
Figure 2:
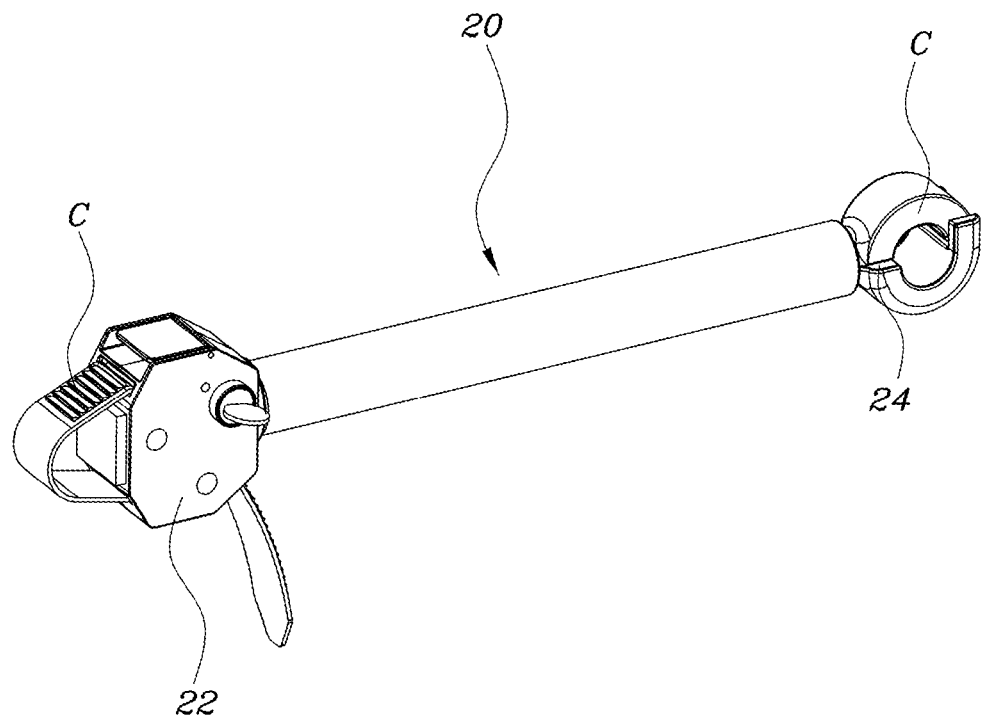
FIG. 2 is a view showing a clamping device of the exemplary bicycle carrier apparatus for a vehicle according to the present invention.
Figure 3:
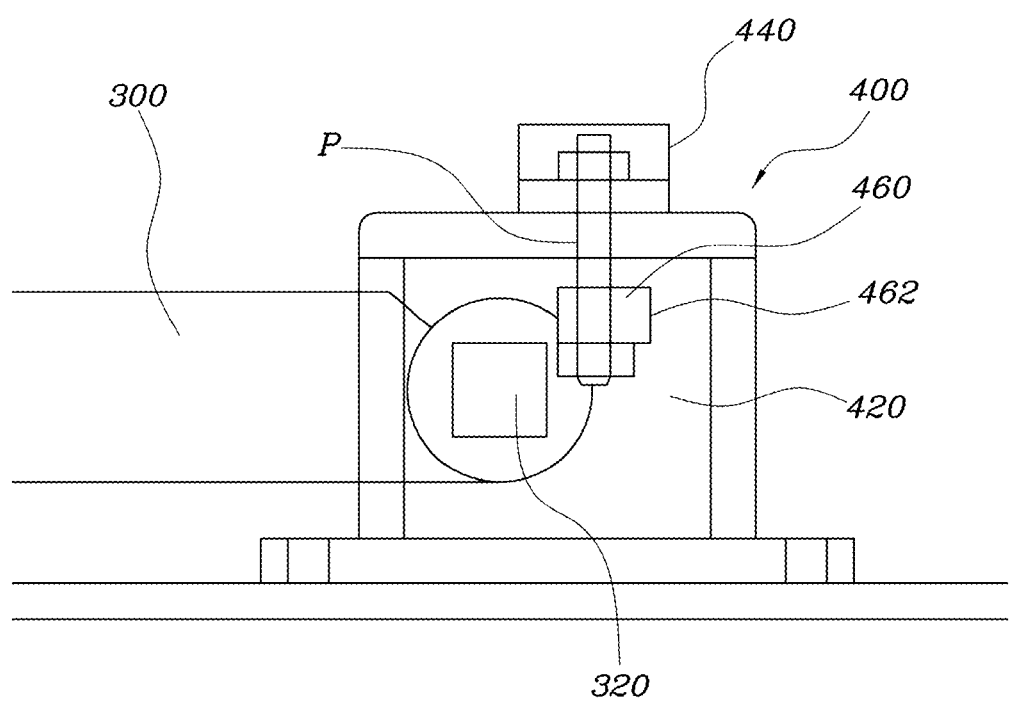
FIG. 3 is a view showing a locking device for the exemplary bicycle carrier apparatus for a vehicle shown in FIG. 1.

FIG. 1 is a view showing a bicycle carrier apparatus for a vehicle according to various embodiments of the present invention, FIG. 2 is a view showing a clamping device of a bicycle carrier apparatus for a vehicle according to various embodiments of the present invention, FIG. 3 is a view showing a locking device for a bicycle carrier apparatus for a vehicle shown in FIG. 1, and FIGS. 4 to 7 are views illustrating the bicycle carrier apparatus for a vehicle shown in FIG. 1.

As shown in FIG. 1, a bicycle carrier apparatus according to various embodiments of the present invention includes a slide carrier 100 sliding in a front-rear direction of a rear bumper beam 10 to be drawn in and out of the rear bumper beam, extension supports 200 laterally stretching out on the slide carrier 100 to load a bicycle, a retainer 300 rotatably provided on the slide carrier 100, with a stop block 320 (shown in FIG. 3) having a plurality of angled surfaces and provided on an end of the retainer 300, and a locking device 400 that is fixed to the slide carrier 100 and to which the end of the retainer 300 is rotatably coupled, the locking device 400 being selectively stopped by the stop block 320 so that the locking device 400 can restrict a rotation of the retainer 300.

As described above, the bicycle carrier apparatus for a vehicle of the present invention includes the slide carrier 100 that slides on the rear bumper beam 100 and the extension supports 200 that stretch out from the slide carrier 100 and laterally move to fit the size of a bicycle. Accordingly, the slide carrier 100 is drawn inside the rear bumper beam 10 of a vehicle not to be exposed when not in use, and is drawn out of the rear bumper beam 10 so that a bicycle can be loaded, when the bicycle loading is desired. The extension supports 200 may be a pair symmetrically arranged and they stretch out in opposite directions, so they can stretch away from each other to fit the size of a bicycle.

In particular, since the retainer 300 is rotatably disposed on the slide carrier 100, a bicycle loaded on the extension supports 200 is retained by the retainer 300 through the clamping device 20. As shown in FIG. 2, the clamping device 20 is provided with a clamping structure C at each of opposite ends 22 and 24 thereof. Here, the clamping device 20 is coupled to the body of a bicycle at the first end 22, and is coupled to the retainer 300 at the second end 24 so that the clamping device 20 can firmly clamp the loaded bicycle. The clamping device 20 is a means for clamping a bicycle and is well known to those skilled in the art, and further explanation is thus deemed unnecessary.

The retainer 300 is folded on the slide carrier 100, but in order to load a bicycle, it is turned upward and then fixed with the body of the bicycle on the extension supports 200, so the loaded bicycle can be more firmly fixed.

The retainer 300 is rotatably mounted by locking devices 400 on the slide carrier 100. Here, in response to an operation of locking devices 400, the retainer 300 may rotate or be locked at a rotated position.

That is, the locking devices 400 keep the retainer 300 folded, and when a user operates the locking devices 400 to release the retainer 300, the retainer 300 is allowed to rotate. The retainer 300 can be also locked to a rotated position.

In detail, as shown in FIG. 1, guide rails 12 extending frontward and rearward are disposed on the rear bumper beam 10 and the slide carrier 100 has side rails 120 sliding on the guide rails 12, so the slide carrier 100 can be drawn in and out along the guide rails 12.

That is, the slide carrier 100 is configured such that the side rails 120 can slide along the guide rails 12 fixed to the rear bumper beam 10. The slide carrier 100 is equipped with a separate motor connected with the guide rails 12 and rollers are rolled on the guide rails 12 so that when the motor is operated, the slide carrier 100 can move along the guide rails 12. To this end, the motor has a pinion structure and the guide rails 12 have a rack structure, so the motor and the guide rails 12 can be connected in the rack and pinion structure, and the motor can be controlled by a user using a remote controller.

Extension rails 140 are fixed on the slide carrier 100 between the side rails 120 and the extension supports 200 are slidably disposed on the extension rails 140, so the extension supports 200 can slide laterally along the extension rails 140.

That is, the extension rails 140 are arranged laterally on the slide carrier 100, and the extension supports 200 are coupled to the extension rails 140 such that the extension supports 200 slide along the extension rails 140. The extension supports 200 are provided in a pair to laterally stretch out, so they can be set to fit the width of a bicycle.

Hereafter, the structure for locking a rotated position of the retainer 300 according to the present invention will be described.

As shown in FIG. 3, the stop block 320 of the retainer 300 may be configured as a polygonal block provided with a plurality of flat surfaces having a predetermined length relative to a frontward and rearward rotating direction of the retainer 300. Because the stop block 320 of the retainer 300 is configured as the polygonal block provided with the flat surfaces having the predetermined length as described above, the stop block 320 will come into contact with a locking rod 460 of the locking device 400 that will be described later herein during a rotation of the retainer 300. Accordingly, an angled surface of the stop block 320 will be caught by the locking rod 460 of the locking device 400, and the rotation of the retainer 300 is stopped by the locking rod 460. Thus, the rotated position of the retainer 300 is locked.

In various embodiments of the present invention shown in the accompanying drawings, the stop block 320 of the retainer 300 is configured as a rectangular cross-sectional block having four flat surfaces, so that the stop block 320 can lock the rotated position of the retainer 300 at a folded position or at a vertically standing position. Of course, it should be understood that the stop block 320 of the retainer 300 may be configured as a polygonal block shape having a plurality of flat surfaces so that the stop block 320 can lock the rotated position of the retainer 300 at various positions.

Figure 4:
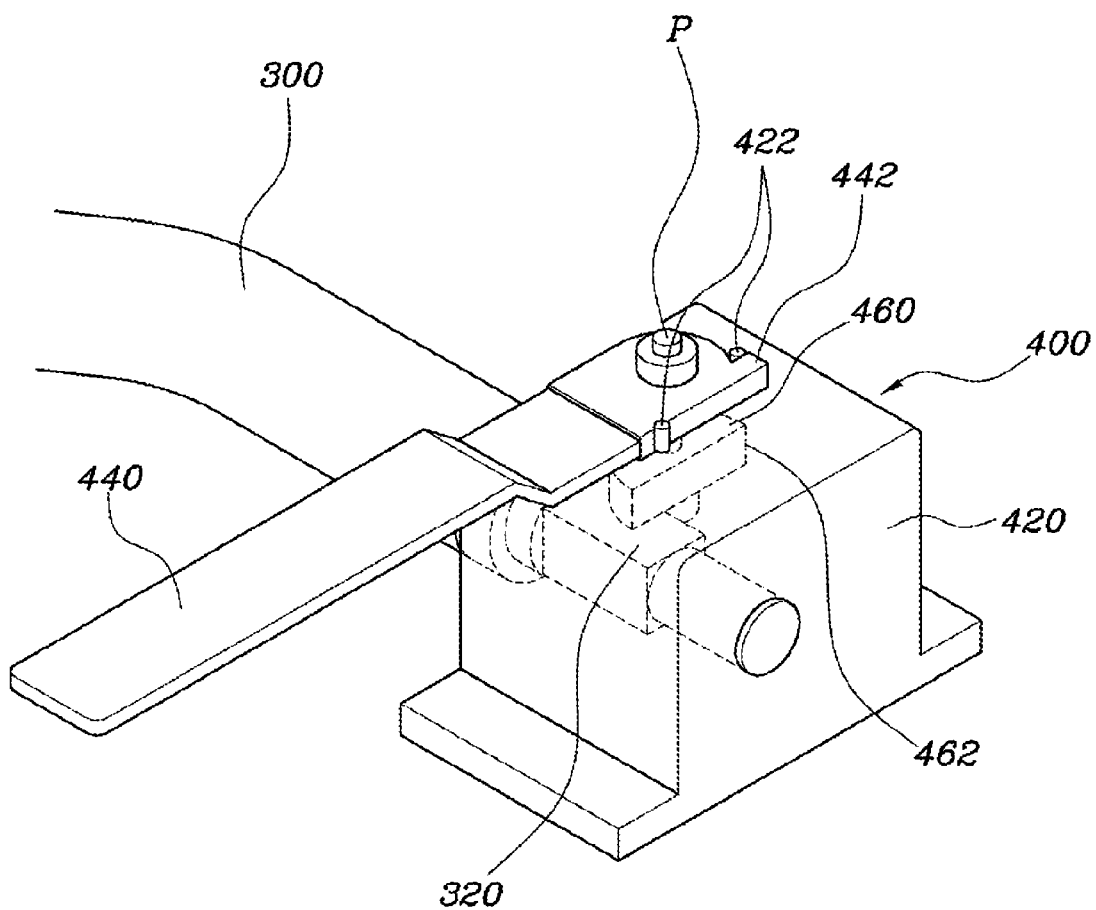
FIG. 4, FIG. 5, FIG. 6, and FIG. 7 are views illustrating the exemplary bicycle carrier apparatus for a vehicle shown in FIG. 1.

Further, as shown in FIG. 4, the locking device 400 includes a housing 420 mounted to the slide carrier 100, with an end of the retainer 300 laterally passing through the housing 420, an operation lever 440 externally provided on the housing 420 such that the operation lever 440 is horizontally rotated frontward and rearward, and the locking rod 460 internally provided inside the housing 420 at a location adjacent to the end of the retainer 300 and rotated in conjunction with a rotation of the operation lever 440 so as to be caught by an angled surface of the stop block 320 of the retainer 300.

Here, the housing 420 may be mounted to the side rails 120 of the slide carrier 100, with a space defined in the housing 420 and an end of the retainer 300 passing through the housing 420. Particularly, the end of the retainer 300 is configured such that the portions of the end of the retainer 300 that pass through the opposite sidewalls of the housing 420 have circular cross-sections so that the retainer 300 can rotate relative to the housing 420. Here, a bearing may be provided in a contact junction between the housing 420 and the end of the retainer 300.

Particularly, the housing 420 is provided with the operation lever 440 that is installed on the housing 420 so as to be exposed outside the housing 420 and with the locking rod 460 that is installed inside the housing 420 so as to be rotated in conjunction with a rotation of the operation lever 440. Accordingly, when the locking rod 460 is rotated in conjunction with a rotation of the operation lever 440, the locking rod 460 comes into contact with the stop block 320 so that the locking rod 460 stops the rotation of the stop block 320.

Described in detail, the operation lever 440 is externally provided on the top wall of the hollow housing 420 and the locking rod 460 is internally provided at a location inside the top wall of the housing 420. Here, the operation lever 440 and the locking rod 460 may be combined with each other by a hinge pin P that passes vertically through the operation lever 440, the top wall of the housing 420, and the locking rod 460.

In other words, the hinge pin P rotatably passes through the top wall of the housing 420, with the operation lever 440 mounted to the upper part of the hinge pin P and with the locking rod 460 mounted to the lower part of the hinge pin P. Due to the above-mentioned combination, when the operation lever 440 is rotated in a direction by a user, the locking rod 460 that is tightly combined with the hinge pin P is rotated in the same direction so that the locking rod 460 comes into contact with the stop block 320 of the retainer 300.

Here, a first end of the operation lever 440 is rotatably mounted to the upper surface of the top wall of the housing 420 such that the lever 440 is horizontally rotated frontward and rearward, with a stop protrusion 442 protruding from the first end of the operation lever 440. A second end of the operation lever 440 extends from the first end so that a user can rotate the lever 440 while holding the second end of the lever 440. Locking protrusions 422 protrude from the upper surface of the top wall of the housing 420 such that during a rotation of the operation lever 440, the stop protrusion 442 of the lever 440 is caught by the locking protrusions 422, thereby stopping the rotation of the lever 440.

In other words, the stop protrusion 442 is provided on the operation lever 440, and the locking protrusions 422 are provided on the upper surface of the top wall of the housing 420 so that the rotation angle of the operation lever 440 can be limited within a predetermined range. As shown in FIG. 3, the locking protrusions 422 protrude from the upper surface of the top wall of the housing 420 at spaced locations within a radius of rotation of the stop protrusion 442 that is formed by the rotation of the operation lever 440. Thus, the rotation of the operation lever 440 is limited to an angular range defined by the positions of the locking protrusions 422.

Due to the above-mentioned construction, the user can accurately control the rotational direction of the operation lever 440 when locking or releasing the operation lever 440, so that the present invention can prevent a mis-operation of the user for the operation lever 440. Further, the user can accurately control the rotation of the locking rod 460 between a position at which the locking rod 460 comes into contact with the stop block 320 of the retainer 300 and another position at which the locking rod 460 is fully spaced apart from the stop block 320 of the retainer 300 by accurately rotating the operation lever 440.

Further, an eccentric protrusion 462 protrudes from an eccentric position of the locking rod 460 such that in an initial position, the eccentric protrusion 462 does not interfere with the stop block 320 of the retainer 300, but when the eccentric protrusion 462 is rotated in conjunction with a rotation of the operation lever 440, the eccentric protrusion 462 comes into contact with the stop block 320, thereby stopping the rotation of the retainer 300.

In other words, when the locking rod 460 is rotated in conjunction with a rotation of the operation lever 440, the eccentric protrusion 462 that protrudes from the eccentric position of the locking rod 460 comes into contact with the stop block 320 of the retainer 300 and stops a rotation of the retainer 300. Because the eccentric protrusion 462 is provided on the eccentric position of the locking rod 460 as described above, a user can accurately rotate the operation lever 440 such that the rotation of the retainer 300 is stopped when the eccentric protrusion 462 of the locking rod 460 comes into contact with the stop block 320 of the retainer 300. In the present invention, the eccentric protrusion 462 of the locking rod 460 may be configured such that two protrusions 462 symmetrically protrude from the locking rod 460.

Figure 5:
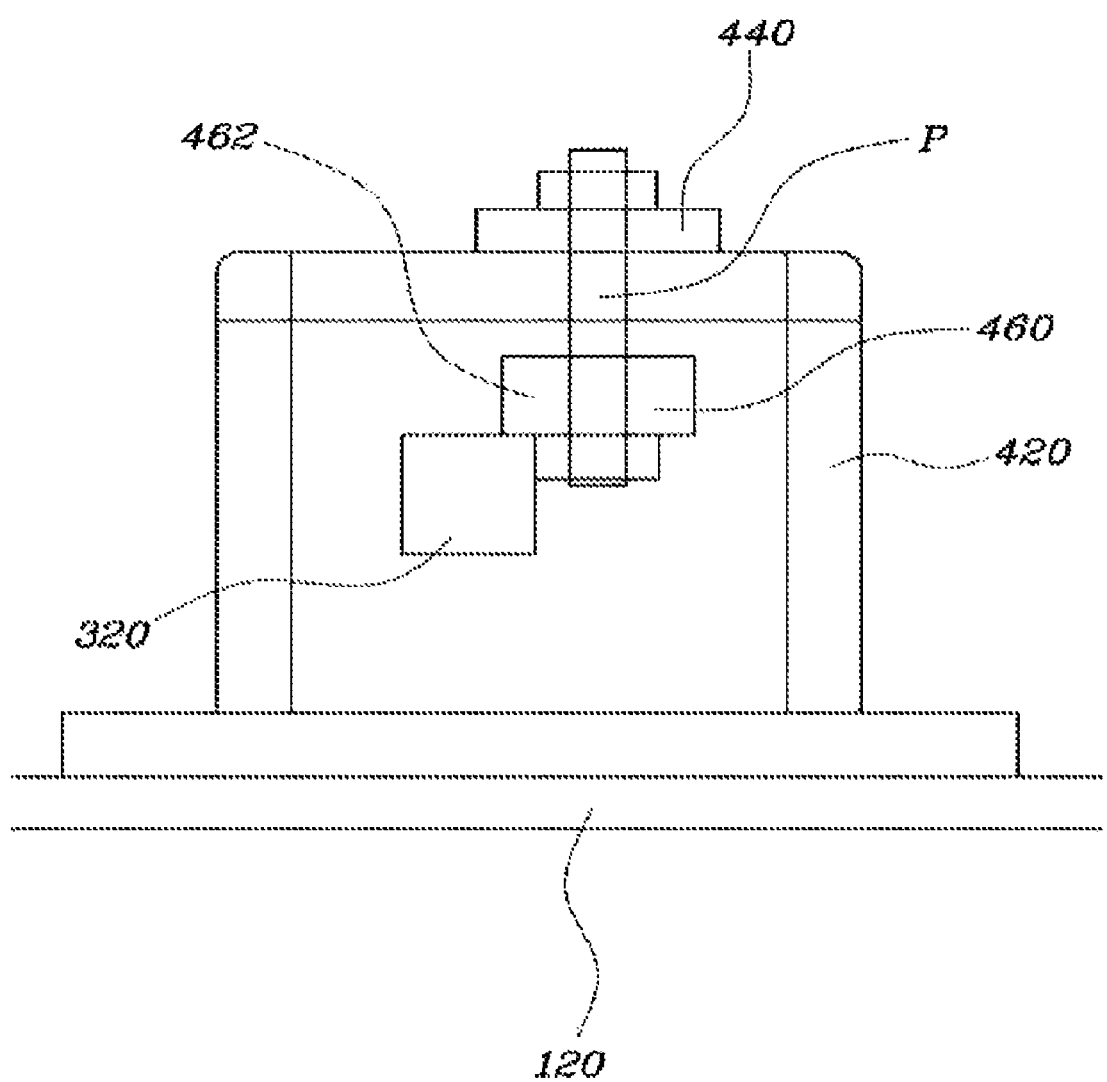

The above-mentioned bicycle carrier apparatus according to the present invention will be operated as follows. As shown in FIGS. 4 and 5, when the eccentric protrusion 462 of the locking rod 460 comes into contact with and is caught by a flat surface of the stop block 320 of the retainer 300 in a folded state of the retainer 300, the retainer 300 can be locked in the folded state.

Figure 6:
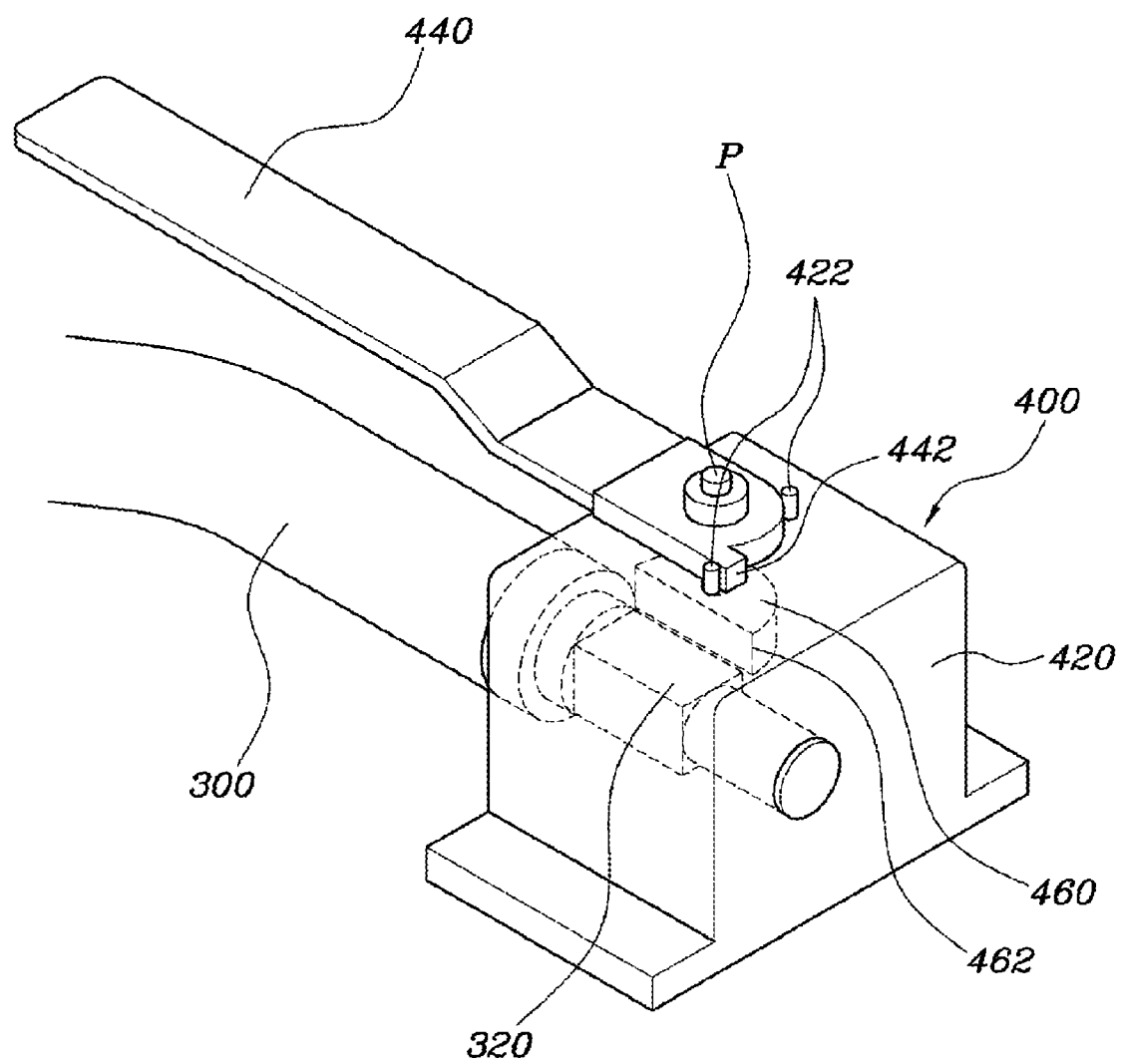
Figure 7:
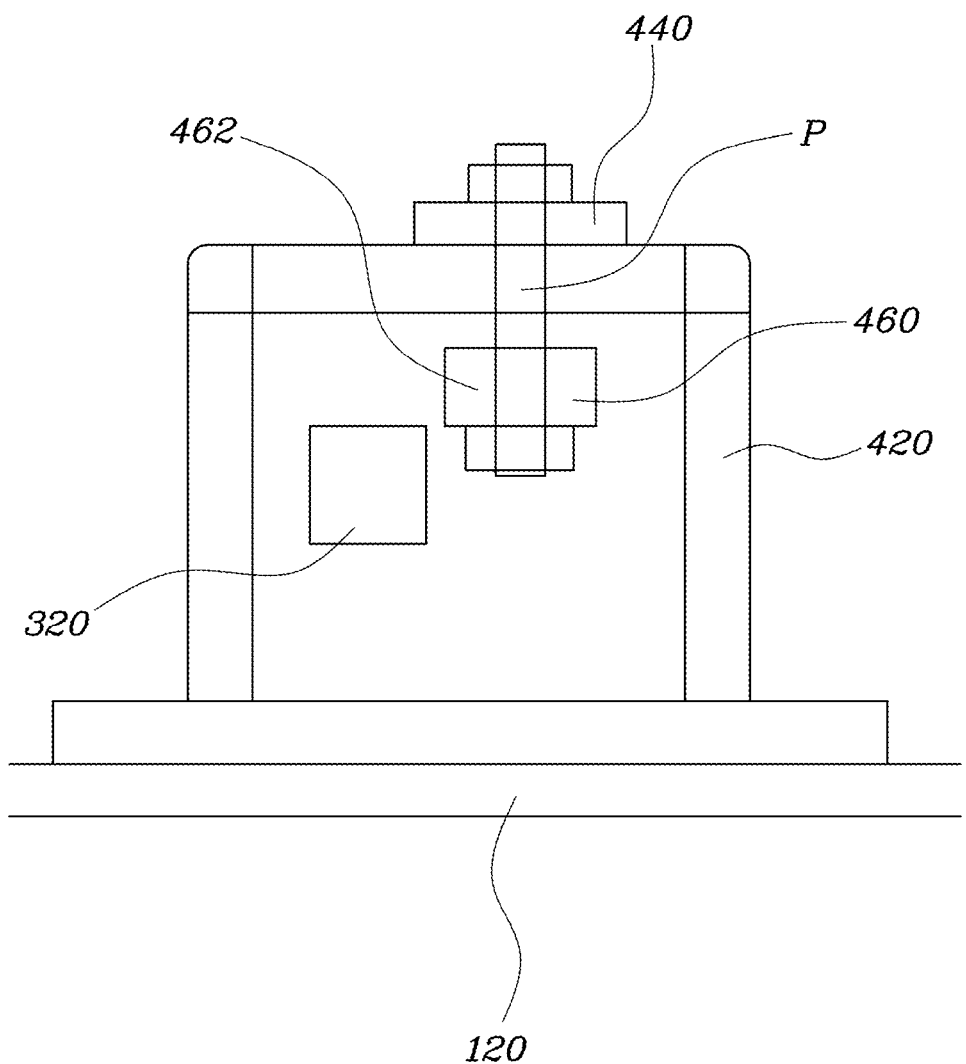

When it is desired to use the retainer 300, a user rotates the second end of the operation lever 440 in a direction, as shown in FIGS. 6 and 7. During the rotation of the operation lever 440, the locking rod 460 is rotated in the same direction, and the eccentric protrusion 462 of the locking rod 460 is released from the stop block 320 of the retainer 300 and is moved to a position at which the eccentric protrusion 462 does not interfere with the stop block 320.

Accordingly, the retainer 300 is allowed to be rotated so that a user can rotate the retainer 300 to a vertical standing position at which the retainer 300 can be connected to a bicycle. After fully rotating the retainer 300 to the vertical standing position, the operation lever 440 is rotated to an initial position thereof at which the eccentric protrusion 462 of the locking rod 460 comes into contact with and is caught by the stop block 320 of the retainer 300. Accordingly, the locking structure of the bicycle carrier apparatus according to the present invention can lock the rotated position of the retainer 300.

According to the bicycle carrier apparatus for a vehicle which has the structure described above, the carrier is drawn in the rear bumper beam 10 at the rear of a vehicle, so it is not exposed to the outside when not in use, but is automatically drawn out of the rear bumper beam 10 to load a bicycle, and therefore, the external appearance of a vehicle is maintained and convenience is also improved.

Further, it is more convenient to use the retainer 300 for retaining a loaded bicycle with a clamping device 20, so the commercial value is improved.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bicycle carrier apparatus for a vehicle, comprising:
   a slide carrier configured to slide in a front-rear direction of a rear bumper beam to be drawn in and out of the rear bumper beam;
   extension supports laterally extended on the slide carrier to load a bicycle;
   a retainer rotatably provided on the slide carrier, with a stop block having a plurality of angled surfaces and provided on an end of the retainer; and
   a locking device fixed to the slide carrier and to which the end of the retainer is rotatably coupled,
   wherein the stop block is configured to be selectively stopped by the locking device so that the locking device restricts a rotation of the retainer,
   wherein the locking device includes:
      a housing mounted to the slide carrier, with the end of the retainer laterally passing through the housing;
      an operation lever externally provided on the housing such that the operation lever is horizontally rotated frontward and rearward; and
      a locking rod internally provided inside the housing at a location adjacent to the end of the retainer and coupled to the operation lever, wherein the locking rod is rotated in conjunction with a rotation of the operation lever so as to abut against the stop block of the retainer to prevent the stop block from rotating.

2. The bicycle carrier apparatus of claim 1, wherein guide rails extending frontward and rearward are disposed on the rear bumper beam, and the slide carrier has side rails configured to slide on the guide rails, so the slide carrier is drawn in and out along the guide rails.

3. The bicycle carrier apparatus of claim 2, wherein extension rails are provided on the slide carrier between the side rails, and the extension supports are slidably disposed on the extension rails to slide laterally along the extension rails.

4. The bicycle carrier apparatus of claim 1, wherein the stop block of the retainer comprises a polygonal block provided with a plurality of flat surfaces relative to a frontward and rearward rotating direction of the retainer.

5. The bicycle carrier apparatus of claim 4, wherein the stop block of the retainer comprises a rectangular cross-sectional block having four flat surfaces.

6. The bicycle carrier apparatus of claim 1, wherein the operation lever is externally provided on a top wall of the housing and the locking rod is internally provided inside the top wall of the housing, and
   wherein the operation lever and the locking rod are coupled to each other by a hinge pin that passes vertically through the operation lever, the top wall of the housing, and the locking rod.

7. The bicycle carrier apparatus of claim 1, wherein a first end of the operation lever is rotatably mounted to the top wall of the housing such that the operation lever is rotated frontward and rearward, with a stop protrusion protruding from the first end of the operation lever, and a second end of the operation lever extends from the first end for a user to rotate the operation lever while holding the second end of the operation lever, and
   wherein a locking protrusion protrudes from the top wall of the housing such that during the rotation of the operation lever, the stop protrusion of the operation lever is configured to abut against the locking protrusion, thereby stopping the rotation of the operation lever.

8. The bicycle carrier apparatus of claim 1, wherein an eccentric protrusion protrudes from an eccentric position of the locking rod such that in an initial position, the eccentric protrusion does not interfere with the stop block of the retainer, but when the eccentric protrusion is rotated in conjunction with the rotation of the operation lever, the eccentric protrusion is configured to come into contact with the stop block, thereby stopping the rotation of the retainer.

\* \* \* \* \*